Sept. 6, 1966  O. W. BONNAFE  3,270,395
BROACH
Filed Feb. 3, 1964  2 Sheets-Sheet 1
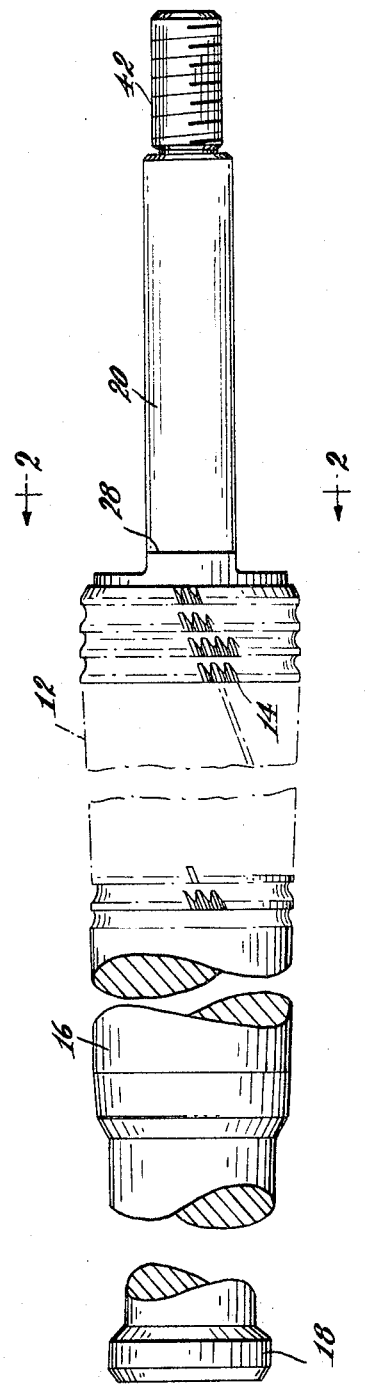
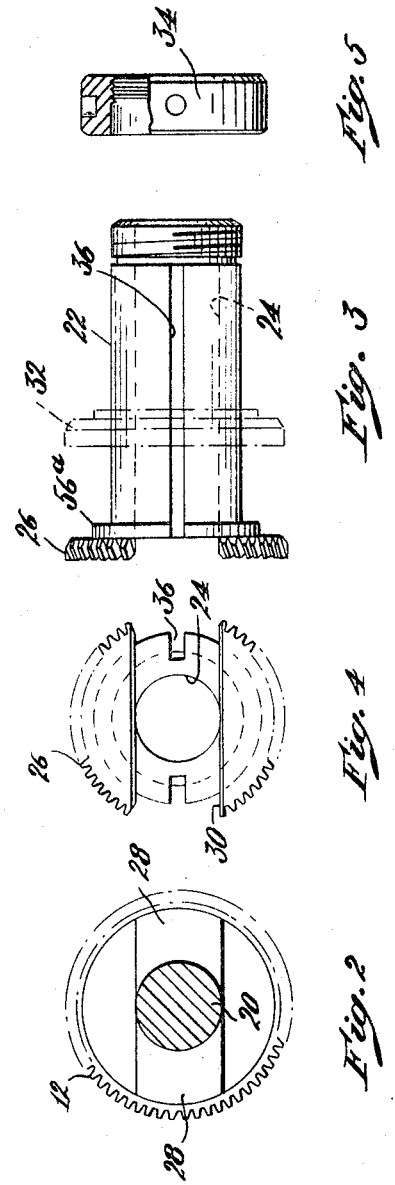
INVENTOR
Oliver W. Bonnafe
BY Roberts, Cushman + Grover
ATTORNEY

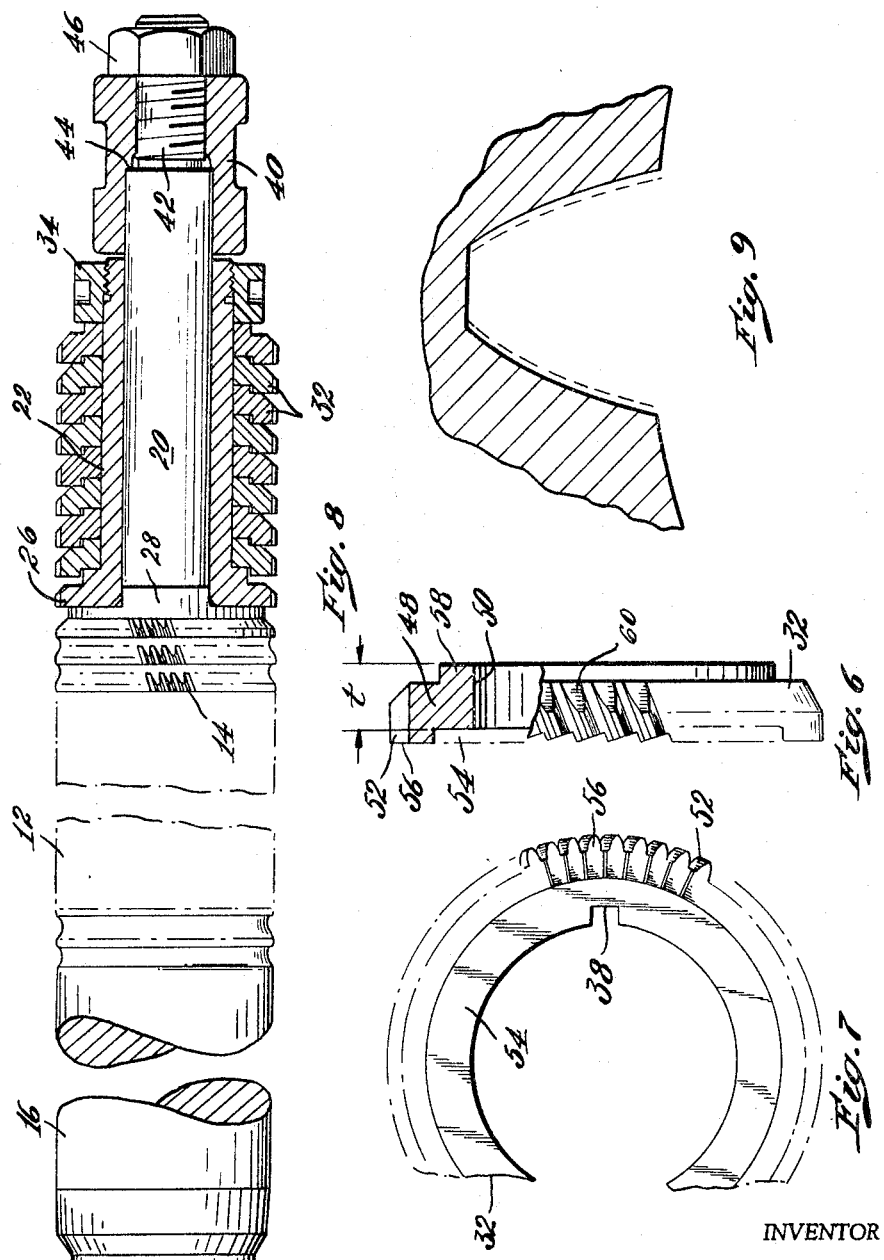

United States Patent Office 3,270,395
Patented Sept. 6, 1966

3,270,395
BROACH
Oliver W. Bonnafe, Hudson, Mass., assignor to The Lapointe Machine Tool Company, Hudson, Mass., a corporation of Maine
Filed Feb. 3, 1964, Ser. No. 342,295
8 Claims. (Cl. 29—95.1)

This application is a continuation-in-part of application Serial No. 727, filed January 6, 1960, and now abandoned.

This invention relates to broaching tools and especially to broaches for generating and finishing internal helical grooves, however, it is to be understood that it is equally applicable to the formation of splines, tooth spaces, and the like.

As herein illustrated, the broach has a set of roughing cutters of progressively increasing diameter for generating internal helical grooves and rearwardly thereof a set of finishing cutters of uniform diameter and of successively increasing tooth thickness for shaving the roughed groove. The finishing cutters are bodily movable relative to the axis of the roughing cutters a predetermined amount and there is a pilot interposed between the roughing cutters and the finishing cutters which is fixed to the finishing cutters for rotation therewith and is operable, by engagement with the roughed groove, to align the finishing cutters with the groove. There is a draw bar at the forward end of the roughing cutters and an arbor at the rear end. A sleeve mounted on the arbor supports the pilot at the rear end of the roughing cutters. The finishing cutters are constituted by a series of cutter discs arranged axially along the sleeve face-to-face. Each cutter disc is of the same diameter and thickness, but the teeth on successive cutter discs increase progressively in width from the pilot and rearwardly and are disposed at an angle to the axis of the sleeve such that they form helical rows of teeth lengthwise of the sleeve.

The principal object of this invention is to enable resharpening the cutter discs without having to discard any more than the cutter disc at the leading end, that is, the cutter disc next to the pilot by removing it, repositioning the remaining cutter discs by pushing them forwardly along the sleeve against the pilot and adding a new cutter disc to the opposite end. This is achieved, in accordance with this invention, without displacement of the helical continuity of the rows of teeth lengthwise of the broach by supporting the cutter discs so that the distance between successive teeth in any continuous row of teeth lengthwise of the support is equal to the lead divided by the number of rows of teeth or a multiple thereof.

The invention will now be described in greater detail with reference to the accompanying drawings wherein:

FIG. 1 is a plan view of the broach, broken away in part, showing the roughing cutters, the finishing or shaving cutters being omitted;

FIG. 2 is a diametrical section taken on the line 2—2 of FIG. 1;

FIG. 3 is a plan view of the sleeve with a pilot at its forward end, the sleeve being adapted to receive a plurality of finishing cutters, a single one of which is shown in phantom;

FIG. 4 is an elevation as seen from the left end of FIG. 3;

FIG. 5 is a lock nut adapted to be screwed onto the end of the sleeve to hold the shaving cutters thereon;

FIG. 6 is an edge view, partly in section, of a shaving cutter;

FIG. 7 is a fragmentary view of the shaving cutter as seen from the left-hand end of FIG. 6;

FIG. 8 is a plan view of the broach, broken away in part, with the sleeve, pilot and shaving cutters mounted thereon; and FIG. 9 is a fragmentary section of an involute groove as formed by the roughing cutters, showing in dotted lines the surface to be removed by the shaving cutters.

Referring to the drawings (FIG. 1), the broach has a plurality of circular cutters 12, each cutter having angularly disposed teeth 14 which collectively form helical rows of teeth lengthwise of the tool designed to cut helical slots in the work piece. The cutters increase in diameter, lengthwise of the broach, from the forward end at the left (FIG. 1) toward the rear end at the right. At the forward end of the broach there is a pilot 16 from which extends a head 18 adapted to be connected to a pulling head. At the rear end of the broach there is an arbor 20. A sleeve 22 (FIG. 3) containing an axial opening 24, corresponding in diameter to the arbor 20, is mounted on the arbor (FIG. 8) with one end adjacent the roughing cutters and on this end there is a pilot 26 (FIG. 3). The pilot 26 has peripherally thereof a plurality of radially extending teeth disposed at an angle to the sleeve corresponding to the angle of the roughing teeth. The pilot is of substantially the same diameter as the last of the roughing cutters however the teeth are of slightly less thickness.

The end face of the last of the roughing cutters has a diametrically disposed tongue 28 (FIG. 2) and the face of the pilot contains a diametrically disposed slot 30 (FIG. 4) within which the tongue 28 is engaged when the sleeve is mounted on the arbor with the pilot adjacent the last of the roughing cutters. The tongue 28 and slot 30 are machined so that there is a slight clearance between the two, for example, in the order of .001″. Thus, the sleeve is free to turn about the axis of the arbor 20, relative to the roughing cutters, a predetermined amount.

A plurality of finishing or shaving cutters 32 are mounted on the sleeve behind the pilot, as shown in FIG. 8, and are held thereon by a lock nut 34 which is screwed onto the rear end of the sleeve. To hold the shaving cutters in proper alignment the sleeve has diametrically disposed, axially extending keyways 36 and each of the shaving cutters has correspondingly located keyways 38 for receiving splines. The sleeve is held on the arbor by a spacer 40, which slips on over the threaded portion 42 at the rear end of the arbor, and a lock nut 46 screwed onto the threaded portion 42. The spacer has an internal shoulder 44 for limiting its axial movement with respect to the sleeve so as to leave a clearance between its inner end and the rear end of the sleeve which allows the sleeve to move slightly endwise and prevents binding of the sleeve on the arbor.

Each of the shaving cutters 32 is in the form of an annular disc 48 containing a central hole 50 corresponding in diameter to the outside diameter of the sleeve 22 and has peripherally thereof radial extending teeth 52 disposed at an angle to the axis of the sleeve such that the teeth on successive cutters form helical rows of teeth lengthwise of the sleeve. The face of each disc at the left side (FIG. 6) contains a circular recess 54 which is larger than the hole 50 but is concentric therewith so that the cutting faces 56 of the teeth 52 project beyond the bottom of the recess. The opposite face of each disc has a circular projection 58 concentric with the hole and corresponding substantially in outside diameter to the inside diameter of the recess 52, so that the cutter discs nest one within the other when they are assembled on the sleeve. Each tooth 52 tapers in thickness rearwardly from its cutting face 56, in keeping with conventional practice, to prevent rubbing of the sides of the tooth on the walls of the groove along which it is moving and additionally is relieved at its rear end by beveling as shown at 60. While the discs do not increase in diameter, the cutting faces of the teeth on the successive discs increase in transverse thickness from the end adjacent the pilot rearwardly, so that as the tool is pulled through the work the cutters progressively shave the grooves to size.

In accordance with this invention, to provide for maximum use of the cutter discs by resharpening, the cutter discs are designed so that when the cutter disc next to the pilot becomes undersize, it is only necessary to remove it, shove the remaining cutter discs forwardly thereon up to the pilot, and add a new cutter disc to the opposite end. Since the cutter discs are provided with keyways, by means of which they are keyed to the sleeve, and cannot be rotated relative to each other, renewal of the tool in this fashion can only be achieved, without displacement of the helices of the teeth relative to each other and to the helices of the teeth on the pilot, by making the axial thickness of the cutter discs, as represented by the letter $t$, to wit, the distance between the bearing surfaces formed by the bottom of the recess 54 and the outside face of the projection 58, equal to the lead of the helix of the rows of teeth divided by the number of rows of teeth or a multiple thereof. This relation depends upon the fact that the lead of the helix of a row of teeth lengthwise of the tool is the distance along the axis of the cutter, on which the helix is formed, in which the helix makes one complete turn. Hence, if there are two teeth on the cutter and the cutter is divided midway between its ends, the part at the left end may be removed and since the teeth on the part at the right end bear the same relation to the keyway as the teeth on the part at the left end, the part at the right end may be shifted to the left along the sleeve and the teeth thereon will be in alignment with the teeth on the pilot. If the cutter is divided into four equal parts, the part at the smaller end when it becomes undersize by sharpening may be removed, the remaining parts pushed along the sleeve and a new part added to the larger end. The same result may be achieved by using appropriate spacers between the discs if it is found desirable to make the center portions of the cutter discs of lesser thickness. A projection 56a is provided on the rear side of the pilot 26 for interengagement with the first of the cutter discs and the teeth on the cutter discs are disposed at the same angle as the roughing teeth and the teeth on the pilot.

The broach, as thus designed, is operable to rough out a helical groove in a piece of work and then to finish the involute surface thereof. In other words, the roughing cutters in the conventional manner remove metal at progressively increasing distances from the axis of the hole to form or generate the groove, shown in dotted lines in FIG. 9, whereupon the shaving cutters, which are of uniform diameter but of increasing thickness, shave successive portions from the entire involute surface thereby increasing the width of the groove as a whole up to its final dimension as shown in solid lines.

There is a tendency for the roughing cutters to drift slightly in the direction of the head, that is, rotate toward the lead side of the groove. Hence if the shaving cutters are fixed relative to the roughing cutters they will necessarily make a heavier cut on the lead side of the groove than on the off side. To avoid this, the shaving cutters are mounted on the sleeve so that they can rotate about the axis of the arbor as was previously pointed out. As thus mounted, the pilot at the forward end of the sleeve, by engagement with the roughed groove, guides the shaving cutters into the roughed groove so that substantially the same amount of metal is removed from each side of the groove. The pilot does not have a cutting surface and as it enters the roughed groove will shift the sleeve and hence the cutters following it about the axis of the arbor in one direction or the other to bring them into symmetrical registration with the groove.

Making the finishing or shaving cutters in the form of discs which may be removably assembled on the sleeve has further advantages from the standpoint of manufacture and use. In manufacture, each cutter disc can be much more easily machined to produce the desired cutting teeth than would be possible if the teeth were formed on a cylindrical blank and if error is made in one cutter the whole broach is not spoiled. From the standpoint of use, after the cutters have been sharpened a number of times, it is not necessary to discard all of them but only the one closest to the pilot which, because of sharpening, is undersized. When this cutter has been removed the remaining may be shoved forwardly and a new cutter put on the rear end of the sleeve. Thus each cutter, as it is worn down, is moved forwardly thereby prolonging the life of the broach as a whole and economizing in cost.

It should be understood that the present disclosure is for the purpose of illustration only and that this invention includes all modifications and equivalents which fall within the scope of the appended claims.

I claim:

1. A broach comprising a support, a plurality of cutters, each cutter having peripherally thereof a plurality of radial teeth disposed at an angle to the axis of the support such that the teeth on successive cutters form helical rows of teeth lengthwise of the support, and means non-rotatably mounting the cutters on the support with the teeth on successive cutters in any helical row lengthwise of the support spaced axially by an amount corresponding to the lead of the helix divided by the number of helical rows of teeth.

2. A broach comprising a support, a plurality of cutters, each cutter having a plurality of teeth disposed at an angle to the longitudinal axis of the support such that the teeth on successive cutters form continuous rows of teeth lengthwise of the support, and means supporting the cutters on the support so that the distance between successive teeth in any continuous row of teeth lengthwise of the support is equal to the lead divided by the number of rows of teeth or a multiple thereof.

3. A broach comprising a support, a plurality of cutters non-rotatably mounted on the support in tandem, each cutter having a cylindrical surface on which there are a plurality of radial teeth disposed at an angle to the axis of the support, each tooth having a cutting face at one end, the cutting faces of the teeth on successive cutters increasing progressively in width from one end of the support to the other, and the teeth on the several cutters forming helical rows of teeth lengthwise of the support, characterized in that each cutter corresponds in axial thickness to the lead of the helices of the rows of teeth divided by the number of rows of teeth or a multiple thereof.

4. A broach comprising a support, a plurality of cutters non-rotatably mounted on the support in tandem, each cutter having a cylindrical surface on which there are a plurality of radial teeth disposed at an angle to the axis of the support, each tooth having a cutting face at one end and each tooth being relieved rearwardly of the cutting face, the cutting faces of the teeth on successive cutters increasing progressively in width from one end of the support to the other, and the teeth on the several cutters forming helical rows of teeth lengthwise of the support, characterized in that each cutter corresponds in axial thickness to the lead of the helices of the rows of teeth divided by the number of rows of teeth or a multiple thereof.

5. A broach comprising a support, a plurality of cutters mounted on the support, means non-rotatably securing the cutters to the support, teeth disposed peripherally of the cutters, said teeth collectively forming a plurality of helical rows of teeth lengthwise of the support, the teeth on successive cutters from one end to the other increasing progressively in thickness, characterized in that the cutters correspond in axial thickness to the lead of the helices of the rows of teeth divided by the number of helical rows of teeth.

6. A broach comprising a support, a plurality of cutters non-rotatably mounted on the support, each cutter having a plurality of radial teeth disposed at an angle to the axis of the support, the teeth on the several cutters forming helical rows of teeth lengthwise of the support, and means holding the cutters on the support so that the distance between successive teeth in any helical row of teeth is proportionate to the lead divided by the number of rows of teeth.

7. A broach comprising a support, a pilot at one end of the support having a plurality of radial teeth disposed at an angle to the axis of the support, a plurality of cutter discs non-rotatably mounted in tandem on the support with the cutter disc at one end next to the pilot, said cutter discs having radial teeth disposed at an angle corresponding to that of the teeth on the pilot; the teeth on successive cutter discs collectively forming rows of teeth lengthwise of the support, and means on the support engageable with the cutter disc at the other end to hold the cutter discs engaged between it and the pilot, characterized in that the cutter discs include means operative to hold the successive teeth in any row of teeth lengthwise of the support at a spacing corresponding to the lead divided by the number of rows of teeth.

8. A broach comprising a support, a sleeve on the support, a pilot at one end of the sleeve, a plurality of cutter discs, means non-rotatably holding the cutter discs on the sleeve in tandem with the disc at one end engaged with the pilot, a keeper on the sleeve engaged with the disc at the opposite end of the sleeve, each disc having a plurality of radial teeth disposed at an angle to the axis of the support so that the teeth in successive discs form helical rows of teeth lengthwise of the support which bear a predetermined relation to the pilot, and interengageable spacing means associated with the cutter discs, said spacing means having contact at intervals corresponding to the length of the lead divided by the number of rows of teeth lengthwise of the sleeve.

No references cited.

WILLIAM W. DYER, JR., *Primary Examiner.*

HARRISON HINSON, *Examiner.*